(12) United States Patent
Swanberg et al.

(10) Patent No.: US 11,192,149 B2
(45) Date of Patent: Dec. 7, 2021

(54) ROBOTIC SURFACE-CLEANING ASSEMBLIES AND METHODS

(71) Applicant: The Boeing Company, Chicago, IL (US)

(72) Inventors: Jeffery P. Swanberg, Bonney Lake, WA (US); Kevin Michael Bell, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 780 days.

(21) Appl. No.: 16/036,714

(22) Filed: Jul. 16, 2018

(65) Prior Publication Data

US 2018/0318885 A1 Nov. 8, 2018

Related U.S. Application Data

(62) Division of application No. 14/604,327, filed on Jan. 23, 2015, now Pat. No. 10,040,101.

(51) Int. Cl.
*B08B 1/00* (2006.01)
*B25J 11/00* (2006.01)

(52) U.S. Cl.
CPC ............. *B08B 1/006* (2013.01); *B08B 1/00* (2013.01); *B08B 1/008* (2013.01); *B25J 11/0085* (2013.01)

(58) Field of Classification Search
CPC . B08B 1/006; B08B 1/00; B08B 1/008; B25J 11/0085; A47L 2201/00; A47L 2201/04; A47L 11/4011; A47L 11/4061
USPC ............. 68/3 R; 15/319, 50.1, 50.3, 103, 51, 15/DIG. 2; 101/425, 423, 424; 118/203, 118/264, 207
See application file for complete search history.

(56) References Cited

U.S. PATENT DOCUMENTS

| 1,919,854 | A | 7/1933 | Masseau |
| 2,098,262 | A | 11/1937 | Temple |
| 2,258,733 | A | 10/1941 | Brackett |
| 2,642,599 | A | 6/1953 | Habian |
| 3,104,406 | A | 9/1963 | Rhodes |
| 3,196,472 | A | 7/1965 | Ventrella |

(Continued)

FOREIGN PATENT DOCUMENTS

| WO | WO 2013160288 | 10/2013 | |
| WO | WO-2013160288 A1 * | 10/2013 | ............. B41F 23/08 |

*Primary Examiner* — David G Cormier
*Assistant Examiner* — Thomas Bucci
(74) *Attorney, Agent, or Firm* — Dascenzo Gates Intellectual Property Law, P.C.

(57) ABSTRACT

Methods of cleaning a surface with an assembly comprise (i) delivering cleaning fluid to a first portion of a cleaning fabric and/or a first region of the surface; (ii) engaging the first region with the first portion and moving the first portion in a predefined motion; (iii) disengaging the first portion from the first region; (iv) replacing the first portion with a second portion of the cleaning fabric; (v) engaging the first region with the second portion and moving the second portion in a predefined motion; (vi) disengaging the second portion from the first region; (vii) replacing the second portion with a third portion of the cleaning fabric; (viii) moving the assembly relative to the surface and/or moving the surface relative to the assembly; and (ix) repeating steps (i)-(viii) with respect to a second region of the surface and with the third portion and a fourth portion of the cleaning fabric.

20 Claims, 3 Drawing Sheets

(56) References Cited

U.S. PATENT DOCUMENTS

| | | | |
|---|---|---|---|
| 3,439,372 A | 4/1969 | Collier | |
| 3,443,270 A | 5/1969 | Smith | |
| 3,648,316 A | 3/1972 | Habian et al. | |
| 3,775,798 A | 12/1973 | Thornton-Trump | |
| 3,777,326 A | 12/1973 | Haley et al. | |
| 3,835,498 A | 9/1974 | Arato | |
| 4,344,361 A * | 8/1982 | MacPhee | B41F 35/06 101/141 |
| 4,407,037 A | 10/1983 | Kemble | |
| 4,590,578 A | 5/1986 | Barto, Jr. et al. | |
| 4,654,087 A | 3/1987 | Fujita et al. | |
| 4,668,301 A | 5/1987 | Takigawa | |
| 4,757,763 A * | 7/1988 | MacPhee | B41F 35/06 101/425 |
| 4,826,391 A | 5/1989 | Lawrence et al. | |
| 4,875,412 A | 10/1989 | Wright et al. | |
| 4,922,821 A * | 5/1990 | Nozaka | B41F 35/006 101/156 |
| 4,953,252 A * | 9/1990 | Akisawa | B41F 35/00 101/425 |
| 5,004,156 A | 4/1991 | Montanier | |
| 5,076,202 A | 12/1991 | Falls | |
| 5,092,012 A * | 3/1992 | Rabourn | B64F 5/30 15/53.1 |
| 5,440,986 A | 8/1995 | Braun | |
| 5,456,753 A | 10/1995 | Kuribayashi et al. | |
| 5,490,646 A | 2/1996 | Shaw et al. | |
| 5,515,782 A * | 5/1996 | Ebina | B41F 35/00 101/423 |
| 5,519,914 A * | 5/1996 | Egan | B41F 35/00 101/425 |
| 5,537,924 A | 7/1996 | Krause | |
| 5,758,577 A | 6/1998 | Ebina | |
| 5,797,325 A * | 8/1998 | Ebina | B41F 35/06 101/423 |
| 5,833,762 A | 11/1998 | Wanner et al. | |
| 5,858,111 A | 1/1999 | Marrero | |
| 5,868,073 A * | 2/1999 | Ebina | B41F 35/04 101/425 |
| 5,926,894 A | 7/1999 | Justin | |
| 5,959,423 A | 9/1999 | Nakanishi et al. | |
| 6,029,934 A | 2/2000 | Foster | |
| 6,036,787 A * | 3/2000 | Bennett | B41F 35/005 101/423 |
| 6,134,734 A | 10/2000 | Marrero | |
| 6,247,405 B1 * | 6/2001 | Hanke | B41F 35/00 101/424 |
| 6,292,976 B1 | 9/2001 | Kurcz et al. | |
| 6,308,627 B1 | 10/2001 | König et al. | |
| 6,371,027 B1 * | 4/2002 | Hanke | B41F 35/00 101/425 |
| 6,432,211 B1 * | 8/2002 | Schmitt | B41N 3/06 101/423 |
| 6,547,187 B2 | 4/2003 | Foster | |
| 6,616,102 B1 | 9/2003 | Bond | |
| 7,011,025 B2 * | 3/2006 | Egan | B41F 35/02 101/424 |
| 7,861,347 B2 | 1/2011 | McKeown et al. | |
| 8,590,449 B2 | 11/2013 | Egan | |
| 8,827,410 B2 | 9/2014 | Sheflin et al. | |
| 9,421,757 B2 | 8/2016 | Egan | |
| 2001/0013296 A1* | 8/2001 | Ghisalberti | B41F 35/00 101/424 |
| 2003/0075064 A1* | 4/2003 | Schmutz | B41F 23/002 101/425 |
| 2003/0209159 A1* | 11/2003 | Porat | B41F 35/00 101/425 |
| 2005/0061182 A1* | 3/2005 | Ebina | B41F 35/00 101/425 |
| 2006/0090856 A1* | 5/2006 | Nelson | B29C 70/386 156/510 |
| 2008/0105150 A1* | 5/2008 | Nadolny | B41F 35/00 101/423 |
| 2010/0011980 A1* | 1/2010 | Grandt | B41N 3/03 101/425 |
| 2012/0240800 A1 | 9/2012 | Fumagalli et al. | |

* cited by examiner

ROBOTIC SURFACE-CLEANING ASSEMBLIES AND METHODS

RELATED APPLICATION

This application is a divisional of and claims priority to U.S. patent application Ser. No. 14/604,327, filed on Jan. 23, 2015 and entitled ROBOTIC SURFACE-CLEANING ASSEMBLIES AND METHODS, and the complete disclosure of which is incorporated herein by reference.

FIELD

The present disclosure relates to cleaning surfaces utilizing robotic arms.

BACKGROUND

Aerospace and other structures have long been manufactured from aluminum and other metallic materials and are increasingly being manufactured from composite materials, such as carbon fiber reinforced polymers. In some applications, including aerospace applications, prior to painting a metallic or composite material, it may be critical to clean the surface to be painted. Historically, cleaning a surface to be painted has been time-consuming, requiring manual wiping of the surface by personnel.

SUMMARY

Robotic surface-cleaning assemblies and methods are disclosed. Assemblies include a base configured to be operatively coupled to a robotic arm, a supply of cleaning fabric, an applicator configured to support a portion of cleaning fabric and operatively and selectively position the portion into engagement with a surface to be cleaned, and a source of cleaning fluid configured to operatively and selectively (i) deliver cleaning fluid directly to the portion of cleaning fabric supported by the applicator and/or (ii) deliver cleaning fluid directly to the surface to be cleaned. Some assemblies further include a robotic arm, with the base of the assembly operatively coupled to the robotic arm. Some assemblies further include a scanner configured to detect a cleanliness of the surface to be cleaned.

Methods of cleaning a surface with a robotic surface-cleaning assembly include (i) delivering cleaning fluid to (a) a first portion of a cleaning fabric and/or (b) a first region of the surface, (ii) engaging the first region with the first portion and moving the first portion in a first predefined motion across the first region, (iii) disengaging the first portion from the first region, (iv) replacing the first portion with a second portion of the cleaning fabric, (v) engaging the first region with the second portion and moving the second portion in a second predefined motion across the first region, (vi) disengaging the second portion from the first region, (vii) replacing the second portion with a third portion of the cleaning fabric, (viii) moving the assembly relative to the surface and/or moving the surface relative to the assembly, and (ix) repeating steps (i)-(viii) with respect to a second region of the surface and with the third portion and a fourth portion of the cleaning fabric.

DESCRIPTION

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
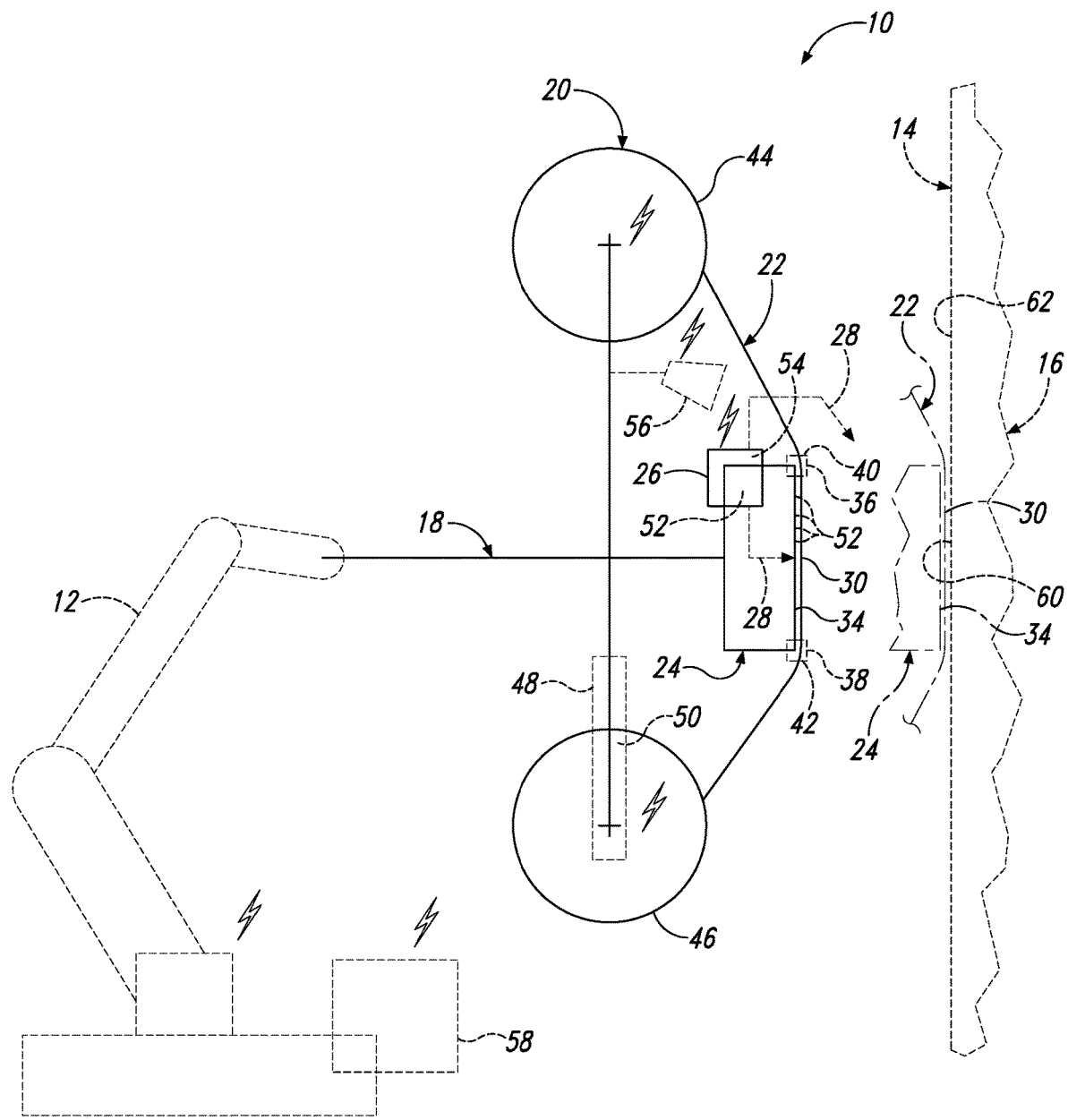
FIG. 1 is a schematic diagram representing robotic surface cleaning assemblies and systems according to the present disclosure.

FIG. 1 schematically presents robotic surface-cleaning assemblies 10 according to the present disclosure. As shown, an assembly 10 may be configured to be operatively coupled to a robotic arm 12. In such embodiments, the assembly 10 additionally or alternatively may be described as an end-effector 10 or a robotic arm end-effector 10. Additionally or alternatively, an assembly 10 may include the robotic arm 12, in which case an assembly 10 additionally or alternatively may be described as a system 10 or as a robot assembly 10.

As the name implies, a robotic surface-cleaning assembly 10 is configured to clean a surface 14 of a component 16. In FIG. 1, surface 14 is schematically represented as a planar surface; however, assemblies 10 also may be configured to clean non-planar surfaces. In some applications, the surface 14 to be cleaned may be defined by a composite material, such as a fiber reinforced composite material. In some applications, the surface 14 to be cleaned may be metallic, such as constructed of aluminum or aluminum alloy. In some applications, the component 16 including a surface 14 may be an aerospace component, such as a fuselage, a fuselage section, a wing, a wing section, a winglet, a horizontal stabilizer, a vertical stabilizer, or other aerospace component. In some applications, the component 16 may be a component of an apparatus that is being manufactured in a manufacturing facility. In some applications, the surface 14 of a component 16 may be in a condition needing to be cleaned prior to painting, coating, or otherwise applying a material to the surface 14.

As schematically illustrated in FIG. 1, robotic surface-cleaning assemblies 10 include a base 18, a supply 20 of cleaning fabric 22, an applicator 24, and a source 26 of cleaning fluid 28.

Base 18 is configured to be operatively coupled to a robotic arm 12, so that the assembly 10 forms an end-effector thereof. Base 18 may take any suitable form and be constructed of any suitable material or materials, such that the base provides structural support to the assembly 10. Base 18 additionally or alternatively may be described as a frame 18 or a body 18 of the assembly 10.

The applicator 24 is supported relative to the base 18 and is configured to support a portion 30 of cleaning fabric 22 from the supply 20 of cleaning fabric. The applicator 24 is further configured to operatively and selectively position the portion 30 into engagement with a surface 14 to be cleaned, as schematically illustrated in FIG. 1 in dash-dot lines. In some embodiments, the applicator 24 may have an applicator surface 34, across which the portion 30 of cleaning fabric 22 extends. Accordingly, in such embodiments, the applicator surface 34 is positioned to selectively position the portion 30 into engagement with the surface 14 to be cleaned, as schematically illustrated in dash-dot lines in FIG. 1. The applicator surface 34 additionally or alternatively may be described as a cleaning pad 34.

In some embodiments, the applicator surface 34 may be defined by a material that is softer than a material that defines a surface 14 to be cleaned. For example, such a configuration may prevent, or at least diminish the possibility of, damage to the surface 14 by the applicator 24. Additionally, the applicator surface 34 may be defined by a material that is compatible with the cleaning fluid 28 being used. Illustrative, non-exclusive examples of suitable materials from which the applicator surface 34 may be constructed include (but are not limited to) polymers, such as (but not limited to) nylons.

As optionally and schematically illustrated in FIG. 1, in some embodiments, the applicator 24 may include a supply-side guide 36 that is configured to position the cleaning fabric 22 relative to the applicator surface 34 and to guide the cleaning fabric 22 across the applicator surface 34 when a new portion 30 is being provided, as discussed in greater detail herein. As also optionally and schematically illustrated in FIG. 1, in some embodiments, the applicator 24 additionally or alternatively may include a take-up-side guide 38 that is configured to position the cleaning fabric 22 relative to the applicator surface 34 and guide the cleaning fabric 22 across the applicator surface 34 when a new portion 30 is being provided. Additionally or alternatively, the applicator 24 may include a supply-side clamp 40, which optionally may be integral with and/or operatively coupled relative to the optional supply-side guide 36, that is configured to selectively secure the cleaning fabric 22 relative to the applicator surface 34, for example, while the portion 30 is operatively wiping a surface 14, as discussed in greater detail herein. Similarly, the applicator 24 additionally or alternatively may include a take-up-side clamp 42, which optionally may be integral with and/or operatively coupled relative to the optional take-up-side guide, which is configured to selectively secure the cleaning fabric 22 relative to the applicator surface 34, for example, while the portion 30 is operatively wiping a surface 14. Optional supply-side clamp 40 and take-up-side clamp 42 additionally or alternatively may be described as locking devices. When present, clamps 40, 42 may take any suitable form. As an example, the clamps 40, 42 may each include a bar that extends adjacent to the respective supply and take-up sides of the applicator to define a channel between the bar and the applicator surface 34. The bar may be configured to be selectively translated toward and away from the applicator surface 34 for selectively decreasing and increasing the size of the channel. Additionally or alternatively, the applicator surface 34 may be configured to be selectively translated toward and away from the bar.

The supply 20 of cleaning fabric 22 is supported relative to the base 18 and may take any suitable form such that the supply 20 operatively and selectively provides a portion 30 of cleaning fabric 22 to be supported by the applicator 24 for operative wiping of a surface 14. Illustrative, non-exclusive examples of suitable cleaning fabrics 22 include (but are not limited to) cleaning fabrics composed of one or more of polyester, nylon, wood pulp, rayon, and cotton. For example, fabrics sold under the PUREWIPE™, DUPONT SONTARA™, KIMTECH SCOTTPURE™, VERACLEAN™, BEMCOT™, AEROTEX™, HERMATEX™, RYMPLECLOTH™, and WESTON™ brands may be suitable cleaning fabrics 22.

In some embodiments, as generally schematically represented in FIG. 1, the supply 20 of cleaning fabric 22 may include a supply spool 44 of clean cleaning fabric 22 for delivery of the cleaning fabric 22 to the applicator 24, as well as a take-up spool 46 for receiving soiled cleaning fabric 22 from the applicator 24, for example, following having been used to operatively wipe a surface 14. Accordingly, the cleaning fabric 22 may take the form of a length of cleaning fabric 22 that extends from the supply spool 44, across the applicator 24, and to the take-up spool 46.

In some embodiments, at least one of the supply spool 44 and the take-up spool 46 may be configured to be selectively translated, optionally linearly translated, relative to the applicator 24 to operatively maintain a desired tension of the cleaning fabric 22 at the applicator 24. For example, as schematically and optionally illustrated in FIG. 1 with respect to the take-up spool 46, the base 18 may include a linear rail 48 along which the take-up spool is configured to be linearly translated responsive to operative movement of the cleaning fabric 22 from the supply spool 44 to the take-up spool 46 to operatively maintain a desired tension in the length of cleaning fabric 22. While schematically and optionally illustrated in connection with the take-up spool 46, a linear rail 48 additionally or alternatively may be implemented in connection with the supply spool 44. Additionally or alternatively, at least one of the supply spool 44 and the take-up spool 46 may be spring-biased relative to the applicator 24 to operatively maintain a desired tension of the cleaning fabric 22 at the applicator 24, which this optional configuration schematically represented by an optional spring 50 in connection with the linear rail 48 in FIG. 1.

As schematically illustrated in FIG. 1, the source 26 of cleaning fluid 28 is supported relative to the base 18. In FIG. 1, the source 26 is schematically illustrated in an overlapping relationship with applicator 24, schematically representing that the source 26 may be (but is not required to be) in some embodiments operatively coupled to the applicator 24. The source 26 is configured to operatively and selectively deliver cleaning fluid 28 directly to the portion 30 of cleaning fabric 22 that is supported by the applicator 24 and/or to operatively and selectively deliver cleaning fluid directly to a surface 14 to be cleaned, with both of these optional and non-mutually exclusive configurations being schematically represented in FIG. 1 with the dashed directional arrows associated with cleaning fluid 28. Illustrative, non-exclusive examples of suitable cleaning fluids include liquid cleaners, gaseous cleaners, and solid cleaners. As a further illustrative, non-exclusive example of a liquid cleaner, a solvent, such as methyl propyl ketone, may be used, for example for cleaning surface 14 constructed of composite plastic materials.

In embodiments in which the source 26 of cleaning fluid 28 is configured to operatively and selectively deliver cleaning fluid 28 directly to the portion 30 of cleaning fabric supported by the applicator 24, the source 26 may deliver cleaning fluid 28 directly to the portion 30 via the applicator surface 34. For example, the applicator surface 34 may define one or more perforations 52 through which the cleaning fluid 28 may be delivered to the portion 30. As an illustrative, non-exclusive example, the source 26 of cleaning fluid 28 may include a piston 53 that is supported relative to the applicator 24 and that is configured to operatively and selectively deliver cleaning fluid 28 directly to the portion 30 of cleaning fabric supported by the applicator via the one or more perforations 52.

In embodiments in which the source 26 of cleaning fluid 28 is configured to operatively and selectively deliver cleaning fluid 28 directly to a surface 14 to be cleaned, the source 26 may include one or more nozzles 54 that are configured to spray cleaning fluid 28 on the surface 14 to be cleaned.

As optionally and schematically represented in FIG. 1, in some embodiments, an assembly 10 may also include a scanner 56 that is supported relative to the base 18 and that is configured to detect a cleanliness, or surface condition, of a surface 14 to be cleaned. For example, an optional scanner 56 may be configured to detect wetting properties of a surface, with the wetting properties reflected in data that is representative of a cleanliness, a treatment level, and/or an adhesion property of the surface. As discussed in greater detail herein, when provided, a scanner 56 may be utilized by an assembly 10, or operator thereof, to alter aspects of the operation of an assembly, for example, to ensure a proper cleaning of a surface 14.

With the above structural description of assemblies 10 as context, an assembly 10 may be described in terms of various configurations, or states, during its use. For example, an assembly 10 may be described as having a readying configuration, in which the applicator 24 and a first portion 30 of cleaning fabric 22 supported by the applicator 24 are spaced away from the surface 14 to be cleaned, and in which at least one of (a) the source 26 of cleaning fluid 28 is delivering cleaning fluid 28 directly to the first portion 30, and (b) the source 26 is delivering cleaning fluid 28 directly to a surface 14 to be cleaned.

Next, an assembly 10 may be described as having a wet cleaning configuration that occurs following the readying configuration, in which the first portion 30 of the cleaning fabric 22 is engaged with a surface 14 to be cleaned, and in which the applicator 24 is moving the first portion 30 in a first predefined motion across the surface 14 to be cleaned. For example, this movement of the applicator 24 in a first predefined motion may be directly caused by the associated robotic arm 12, and may be described as wiping the surface with the first portion 30. As an illustrative, non-exclusive example, the first predefined motion may include an orbital motion; however, other motions, such as reciprocating linear motions, also may be implemented in the wet cleaning configuration. The wet cleaning configuration is so named, because it directly follows the readying configuration, and cleaning fluid 28 has been delivered to the portion 30 and/or to the surface 14. In embodiments that include a supply-side clamp 40 and/or a take-up-side clamp 42, the clamps 40, 42 may secure the cleaning fabric 22 relative to the applicator surface 34 during the wet cleaning configuration, so as to restrict slippage of the portion 30 adjacent to the applicator surface during the motion of the applicator relative to the surface 14.

Next, an assembly 10 may be described as having a transition configuration that occurs following the readying configuration, in which the applicator 24 is spaced away from the surface 14, and in which the supply 20 of cleaning fabric 22 provides a second portion 30 of cleaning fabric 22 supported by the applicator 24, with the second portion 30 having not engaged the surface 14. In embodiments that include a supply-side clamp 40 and/or a take-up-side clamp 42, the clamps 40, 42 may permit the cleaning fabric 22 to be translated relative to the applicator surface 34 during the transition configuration.

Next, an assembly 10 may be described as having a dry cleaning configuration that occurs following the transition configuration, in which the second portion 30 of the cleaning fabric 22 is engaged with the surface 14, and in which the applicator 24 is moving the second portion 30 in a second predefined motion across the surface 14. Similar to the wet cleaning configuration, the movement of the applicator in a second predefined motion may be directly caused by the associated robotic arm 12, may be described as wiping the surface with the second portion, and may include an orbital motion; however, other motions, such as reciprocating linear motions, also may be implemented in the dry cleaning configuration. The dry cleaning configuration is so named, because it directly follows the transition configuration without any cleaning fluid 28 being first delivered to the second portion 30 and/or to the surface 14 immediately prior to the dry cleaning configuration. In embodiments that include a supply-side clamp 40 and/or a take-up-side clamp 42, the clamps 40, 42 may secure the cleaning fabric 22 relative to the applicator surface 34 during the dry cleaning configuration, so as to restrict slippage of the portion 30 adjacent to the applicator surface during the motion of the applicator relative to the surface 14.

In embodiments of assemblies 10 that include an optional scanner 56, an assembly 10 also may be described as having a scanning configuration, in which the scanner 56 is scanning the surface 14 to be cleaned. This optional scanning configuration may be intermittent with one or more of the aforementioned other configurations of assemblies 10 and/or may be simultaneous and/or overlap with one or more of the aforementioned other configurations of assemblies 10.

As optionally and schematically represented in FIG. 1, in some embodiments, an assembly 10 may also include a controller 58 that is configured to control operation of an assembly 10 and robotic arm 12. In FIG. 1, the controller 58 is schematically illustrated in an overlapping relationship with the robotic arm 12, schematically representing that the controller may be operatively coupled to, supported by, and/or integral with the robotic arm 12; however, other configurations also are within the scope of the present disclosure, including configurations in which the controller 58 is partially remote from the robotic arm 12. In FIG. 1, the schematic lightning bolts schematically represent that the controller 58 may be in communication with one or more components of an assembly 10, including the robotic arm 12, the supply 20 of cleaning fabric 22, including the supply spool 44 and/or the take-up spool 46, the source 26 of cleaning fluid 28, as well as the optional linear rail 48 and the optional scanner 56. That is, the controller 58 may be operatively coupled to various components of an assembly 10 for operative operation thereof, such as to facilitate the reconfiguration of the assembly 10 between the readying configuration, the wet cleaning configuration, the transition configuration, the dry cleaning configuration, and the optional scanning configuration. Such coupling and communication may take any suitable form including one or more of electronic control, pneumatic control, hydraulic control, mechanical control, etc.

Additionally, a controller 58 may be and/or include any suitable device or devices that are configured to perform the functions of the controller discussed herein. For example, the controller 58 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

Additionally or alternatively, a controller 58 may include, or be configured to read, computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Accordingly, a controller 58 of an assembly 10 may be programmed to (i) deliver cleaning fluid 28 from the source 26 of cleaning fluid 28 directly to a first portion 30 of the cleaning fabric 22 supported by the applicator 24 and/or deliver cleaning fluid 28 directly to a first region 60 of a surface 14, thus facilitating the readying configuration; (ii) following (i), secure the cleaning fabric with optional clamps 40, 42 and move the applicator 24 to position the first portion 30 of the cleaning fabric 22 into engagement with the surface 14 and move the applicator 24 in a first predefined motion across the first region 60, thus facilitating the wet cleaning configuration; (iii) following (ii), release the cleaning fabric with optional clamps 40, 42 and move the applicator 24 away from the surface 14 and provide by the supply 20 of cleaning fabric 22 a second portion 30 of cleaning fabric 22, thus facilitating the transition configuration; (iv) following (iii), secure the cleaning fabric with clamps 40, 42 and move the applicator 24 to position the second portion 30 of the cleaning fabric 22 into engagement with the surface 14 and move the applicator 24 in a second predefined motion across the first region 60, thus facilitating the dry cleaning configuration; (v) following (iv), move the applicator 24 away from the surface 14 and provide a third portion 30 of cleaning fabric 22 supported by the applicator 24; and (vi) following (iv) and optionally following (v), move the applicator 24 relative to the surface 14 and repeat (i)-(v) with respect to a second region 62 of the surface 14 and with the third portion 30 and a fourth portion 30 of the cleaning fabric 22.

In embodiments of assemblies 10 that include an optional scanner 56, the controller 58 also may be programmed to (vii) receive cleanliness data from the scanner 56 and (a) modify a volume of cleaning fluid 28 delivered during (i); (b) modify a length of time that the applicator 24 is moved in the first predefined motion during (ii), that is, during the wet cleaning configuration; (c) modify the motion of the first predefined motion; (d) modify a length of time that the applicator 24 is moved in the second predefined motion during (iv), that is, during the dry cleaning configuration; (e) modify the motion of the second predefined motion; (f) repeat at least a subset of (i)-(v) one or more times prior to performing (vi); and (g) send a signal to an operator, wherein the signal is indicative of the cleanliness data.

Figure 2:
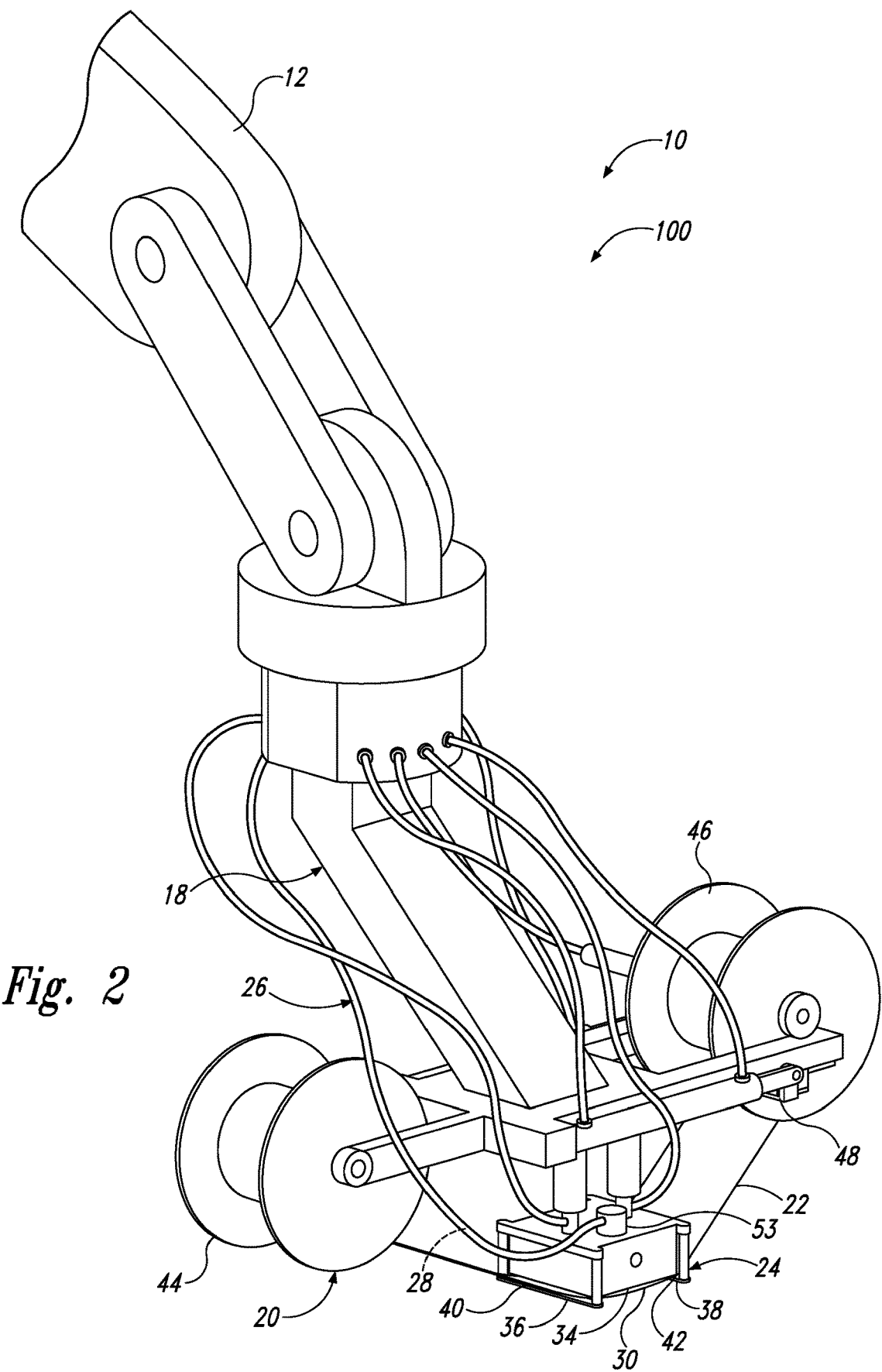
FIG. 2 is a perspective view of an illustrative, non-exclusive example of a robotic surface cleaning assembly according to the present disclosure.

Turning now to FIG. 2, an illustrative non-exclusive example of an assembly 10, indicated and referred to herein as assembly 100, is illustrated. Where appropriate, the reference numerals from the schematic illustration of FIG. 1 are used to designate corresponding parts of assembly 100; however, the example of FIG. 2 is non-exclusive and does not limit assemblies 10 to the illustrated embodiment of assembly 100. That is, assemblies 10 are not limited to the specific embodiment of the illustrated assembly 100, and assemblies 10 may incorporate any number of the various aspects, configurations, characteristics, properties, etc. of assemblies 10 that are illustrated in and discussed with reference to the schematic representation of FIG. 1 and/or the embodiment of FIG. 2, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to assembly 100; however, it is within the scope of the present disclosure that the previously discussed features, variants, etc. may be utilized with assembly 100.

As illustrated in FIG. 2, assembly 100 is an example of an assembly 10 in which the supply 20 of cleaning fabric 22 includes a supply spool 44, a take-up spool 46, and a length of cleaning fabric 22 that extends from the supply spool 44, across the applicator 24, and to the take-up spool 46. The applicator 24 of assembly 100 includes both a supply-side guide 36 that also forms a clamp 40 and a take-up-side guide 38 that also forms a clamp 42 on opposing sides of the applicator surface 34 to operatively guide the length of cleaning fabric 22 across the applicator surface 34. The base 18 of assembly 100 includes an optional linear rail 48 associated with the take-up spool 46 for operatively maintaining a desired tension of the length of cleaning fabric 22 across the applicator surface 34. The source 26 of cleaning fluid 28 of assembly 100 includes a piston 53 for operatively delivering cleaning fluid 28 directly to the portion 30 of cleaning fabric 22 supported by the applicator 24 via the applicator surface 34. Also, as seen by the various illustrated hoses, assembly 100 is partially controlled pneumatically, including operation of clamps 40, 42, the take-up spool 46, the linear rail 48, and the piston 53, among other components.

Figure 3:
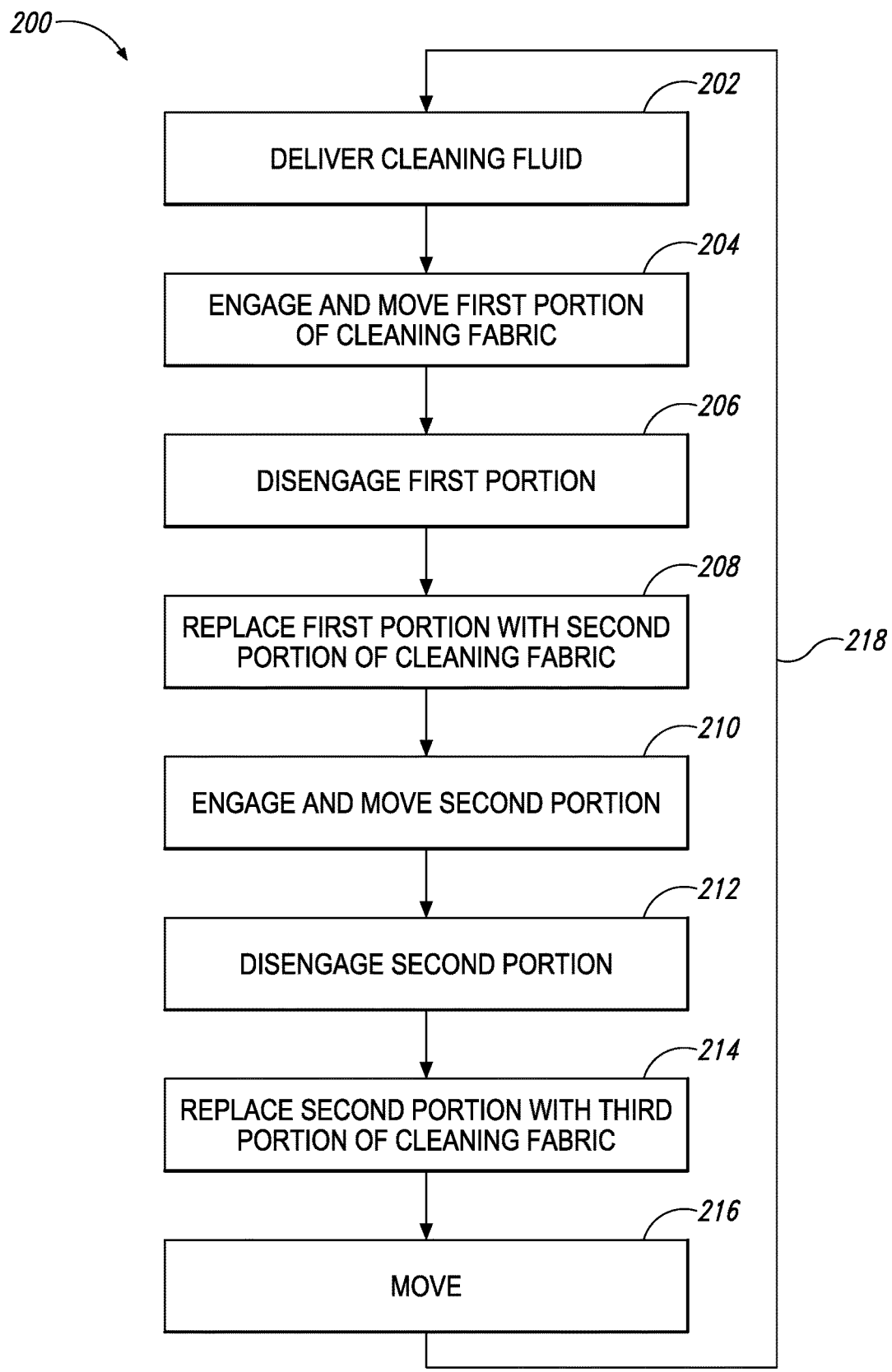
FIG. 3 is a flowchart schematically representing methods of cleaning a surface with a robotic surface-cleaning assembly according to the present disclosure.

FIG. 3 schematically provides a flowchart that represents illustrative, non-exclusive examples of methods 200 of cleaning a surface with a robotic surface-cleaning assembly. The methods and steps illustrated in FIG. 3 are not limiting and other methods and steps are within the scope of the present disclosure, including methods having greater than or fewer than the number of steps illustrated, as understood from the discussions herein. Although not required with respect to all methods 200, some methods 200 may be performed by an assembly 10.

As schematically illustrated in FIG. 3, a method 200 includes at 202 delivering cleaning fluid to (a) a first portion of a cleaning fabric and/or (b) a first region of the surface; at 204 engaging the first region with the first portion and moving the first portion in a first predefined motion across the first region; at 206 disengaging the first portion from the first region; at 208 replacing the first portion with a second portion of the cleaning fabric; at 210 engaging the first region with the second portion and moving the second portion in a second predefined motion across the first region; at 212 disengaging the second portion from the first region; at 214 replacing the second portion with a third portion of the cleaning fabric; at 216 moving the assembly relative to the surface and/or moving the surface relative to the assembly; and at 218 repeating steps 202-216 with respect to a second region of the surface that is different from the first region and with the third portion and a fourth portion of the cleaning fabric.

In some methods 200, the cleaning fluid includes one or more of a liquid cleaner, a gaseous cleaner, and a solid cleaner, optionally a solvent, such as methyl propyl ketone.

In some methods 200, the first predefined motion may include an orbital motion. In some methods 200, the second predefined motion may include an orbital motion. In some methods 200, the first predefined motion may be the same as the second predefined motion.

In some methods 200, the replacing 208 may include advancing a length of cleaning fabric across an applicator. In some such methods 200, the advancing may include advancing the length of cleaning fabric from a supply spool. In some such methods 200, the advancing may further include advancing the length of cleaning fabric from the supply spool to a take-up spool. In some methods 200, the advancing additionally or alternatively further may include maintaining a tension on the cleaning fabric at the applicator.

Some methods 200 optionally also may include scanning the surface to be cleaned or being cleaned and acquiring cleanliness data associated with the surface. For example, some such methods 200 further may include responsive to the scanning and based on the cleanliness data, one or more of: (a) modifying a volume of cleaning fluid delivered during the delivering 202; (b) modifying a length of time that the applicator is moved during the engaging and moving 204; (c) modifying the motion of the first predefined motion; (d) modifying a length of time that the applicator is moved during the engaging and moving 210; (e) modifying the motion of the second predefined motion; (f) repeating at least a subset of steps 202-214 one or more times prior to the moving 216; and (g) sending a signal to an operator, wherein the signal is indicative of the cleanliness data.

In some methods 200, the surface being cleaned may be a planar surface. In some methods 200, the surface being cleaned may be a non-planar surface. In some methods 200, the surface being cleaned may be defined by a reinforced composite plastic material. In some methods 200, the surface being cleaned may be metallic, such as constructed of aluminum or aluminum alloy. In some methods 200, the surface being cleaned may be defined by an aerospace component. In some methods 200, the surface being cleaned may be defined by a component of an apparatus being manufactured in a manufacturing facility. In some methods 200, the method 200 may be performed prior to painting, coating, or otherwise applying a material to the surface being cleaned. Some methods 200 also may include, following the cleaning of the surface, painting, coating, or otherwise applying a material to the surface that was cleaned.

Illustrative, non-exclusive examples of inventive subject matter according to the present disclosure are described in the following enumerated paragraphs:

A. A robotic surface-cleaning assembly, the assembly comprising:
 a base configured to be operatively coupled to a robotic arm;
 a supply of cleaning fabric supported relative to the base;
 an applicator supported relative to the base, wherein the applicator is configured to support a portion of cleaning fabric from the supply of cleaning fabric and operatively and selectively position the portion into engagement with a surface to be cleaned; and
 a source of cleaning fluid supported relative to the base, wherein the source of cleaning fluid is configured to operatively and selectively (i) deliver cleaning fluid directly to the portion of cleaning fabric supported by the applicator and/or (ii) deliver cleaning fluid directly to the surface to be cleaned.

A1. The assembly of paragraph A, wherein the cleaning fabric includes one or more of polyester, nylon, wood pulp, rayon, and cotton.

A2. The assembly of any of paragraphs A-A1, wherein the supply of cleaning fabric includes a supply spool of clean cleaning fabric for delivery of the cleaning fabric to the applicator and a take-up spool for receiving soiled cleaning fabric from the applicator.

A2.1. The assembly of any of paragraphs A-A2, wherein the cleaning fabric includes a length of cleaning fabric that extends from the supply spool, across the applicator, and to the take-up spool.

A2.2. The assembly of any of paragraphs A2-A2.1, wherein at least one of the supply spool and the take-up spool is configured to be selectively translated, optionally linearly, relative to the applicator to operatively maintain a desired tension of the cleaning fabric at the applicator.

A2.3. The assembly of any of paragraphs A2-A2.2, wherein at least one of the supply spool and the take-up spool is spring-biased relative to the applicator to operatively maintain a desired tension of the cleaning fabric at the applicator.

A3. The assembly of any of paragraphs A-A2.3, wherein the applicator defines an applicator surface, wherein the portion of cleaning fabric extends across the applicator surface, and wherein the applicator surface is positioned to selectively position the portion into engagement with the surface to be cleaned.

A3.1. The assembly of paragraph A3, wherein the applicator surface is defined by a material that is softer than a material that defines the surface to be cleaned.

A3.2. The assembly of any of paragraphs A3-A3.1, wherein the applicator surface is defined by one or more of a polymer and a nylon.

A3.3. The assembly of any of paragraphs A3-A3.2, wherein the applicator includes a supply-side guide configured to position the cleaning fabric relative to the applicator surface and guide the cleaning fabric across the applicator surface.

A3.4. The assembly of any of paragraphs A3-A3.3, wherein the applicator includes a take-up-side guide configured to position the cleaning fabric relative to the applicator surface and guide the cleaning fabric across the applicator surface.

A3.5. The assembly of any of paragraphs A3-A3.4, wherein the applicator includes a supply-side clamp configured to selectively secure the cleaning fabric relative to the applicator surface.

A3.6. The assembly of any of paragraphs A3-A3.5, wherein the applicator includes a take-up-side clamp configured to selectively secure the cleaning fabric relative to the applicator surface.

A4. The assembly of any of paragraphs A-A3.6, wherein the source of cleaning fluid includes one or more of a liquid cleaner, a gaseous cleaner, and a solid cleaner, optionally a solvent, such as methyl propyl ketone.

A5. The assembly of any of paragraphs A-A4, wherein the source of cleaning fluid is configured to operatively and selectively deliver cleaning fluid directly to the portion of cleaning fabric supported by the applicator.

A5.1. The assembly of paragraph A5 when depending from paragraph A3, wherein the source of cleaning fluid is configured to operatively and selectively deliver cleaning fluid directly to the portion of cleaning fabric supported by the applicator via the applicator surface.

A5.1.1. The assembly of paragraph A5.1, wherein the applicator surface defines one or more perforations.

A5.1.2. The assembly of any of paragraphs A5.1-A5.1.1, wherein the source of cleaning fluid includes a piston supported relative to the applicator and configured to operatively and selectively deliver cleaning fluid directly to the portion of cleaning fabric supported by the applicator via the one or more perforations.

A6. The assembly of any of paragraphs A-A5.1.2, wherein the source of cleaning fluid is configured to operatively and selectively deliver cleaning fluid directly to the surface to be cleaned.

A6.1. The assembly of paragraph A6, wherein source of cleaning fluid includes one or more nozzles configured to spray cleaning fluid on the surface to the cleaned.

A7. The assembly of any of paragraphs A-A6.1, further comprising: a scanner supported relative to the base, wherein the scanner is configured to detect a cleanliness of the surface to be cleaned.

A8. The assembly of any of paragraphs A-A7,
wherein the assembly has:
(i) a readying configuration, in which the applicator and a first portion of cleaning fabric supported by the applicator are spaced away from the surface to be cleaned, and in which at least one of (a) the source of cleaning fluid is delivering cleaning fluid directly to the first portion, and (b) the source of cleaning fluid is delivering cleaning fluid directly to the surface to be cleaned;
(ii) a wet cleaning configuration that occurs following the readying configuration, in which the first portion of the cleaning fabric supported by the applicator is engaged with the surface to be cleaned, and in which the applicator is moving the first portion in a first predefined motion across the surface to be cleaned;
(iii) a transition configuration that occurs following the wet cleaning configuration, in which the applicator is spaced away from the surface to be cleaned, and in which the supply of cleaning fabric provides a second portion of cleaning fabric supported by the applicator, with the second portion having not engaged the surface to be cleaned;
(iv) a dry cleaning configuration that occurs following the transition configuration, in which the second portion of the cleaning fabric is engaged with the surface to be cleaned, and in which the applicator is moving the second portion in a second predefined motion across the surface to be cleaned.

A8.1. The assembly of paragraph A8 when depending from paragraph A7, wherein the assembly further has:
(v) a scanning configuration, in which the scanner is scanning the surface to be cleaned.

A9. The assembly of any of paragraphs A-A8.1, further comprising:
a controller programmed to:
(i) at least one of (a) deliver cleaning fluid from the source of cleaning fluid directly to a first portion of the cleaning fabric supported by the applicator, and (b) deliver cleaning fluid directly to a first region of the surface to be cleaned;
(ii) following (i), move the applicator to position the first portion of the cleaning fabric into engagement with the surface to be cleaned and move the applicator in a first predefined motion across the first region;
(iii) following (ii), move the applicator away from the surface to be cleaned and provide by the supply of cleaning fabric a second portion of cleaning fabric supported by the applicator, with the second portion having not engaged the surface to be cleaned;
(iv) following (iii), move the applicator to position the second portion of the cleaning fabric into engagement with the surface to be cleaned and move the applicator in a second predefined motion across the first region;
(v) following (iv), move the applicator away from the surface to be cleaned and provide by the supply of cleaning fabric a third portion of cleaning fabric supported by the applicator, with the third portion having not engaged the surface to be cleaned; and
(vi) following (iv) and optionally following (v), move the applicator relative to the surface to be cleaned and repeat (i)-(v) with respect to a second region of the surface to be cleaned and with the third portion and a fourth portion of the cleaning fabric, wherein the second region is different than the first region.

A9.1. The assembly of paragraph A9 when depending from paragraph A7, wherein the controller is further programmed to:
(vii) receive cleanliness data from the scanner and, based at least in part on the cleanliness data, one or more of:
(a) modify a volume of cleaning fluid delivered during (i);
(b) modify a length of time that the applicator is moved in the first predefined motion during (ii);
(c) modify the motion of the first predefined motion;
(d) modify a length of time that the applicator is moved in the second predefined motion during (iv);
(e) modify the motion of the second predefined motion;
(f) repeat at least a subset of (i)-(v) one or more times prior to performing (vi); and
(g) send a signal to an operator, wherein the signal is indicative of the cleanliness data.

A10. The assembly of any of paragraphs A-A9.1, further comprising: the robotic arm, wherein the base is supported by the robotic arm.

A11. The assembly of any of paragraphs A-A10, wherein the surface to be cleaned includes a planar surface.

A12. The assembly of any of paragraphs A-A11, wherein the surface to be cleaned includes a non-planar surface.

A13. The assembly of any of paragraphs A-A12, wherein the surface to be cleaned is defined by a composite plastic material.

A14. The assembly of any of paragraphs A-A13, wherein the surface to be cleaned is defined by an aerospace component, optionally a winglet.

A15. The assembly of any of paragraphs A-A14, wherein the surface to be cleaned is defined by a component of an apparatus being manufactured in a manufacturing facility.

A16. The assembly of any of paragraphs A-A15, further comprising the surface to be cleaned.

A17. The use of the assembly of any of paragraphs A-A16 to clean the surface to be cleaned, optionally prior to painting, coating, or otherwise applying a material to the surface to be cleaned.

B. A method of cleaning a surface with a robotic surface-cleaning assembly, the method comprising:
(i) delivering cleaning fluid to (a) a first portion of a cleaning fabric and/or (b) a first region of the surface;
(ii) following step (i), engaging the first region with the first portion and moving the first portion in a first predefined motion across the first region;
(iii) following step (ii), disengaging the first portion from the first region;
(iv) following step (iii), replacing the first portion with a second portion of the cleaning fabric;
(v) following step (iv), engaging the first region with the second portion and moving the second portion in a second predefined motion across the first region;
(vi) following step (v), disengaging the second portion from the first region;
(vii) following step (vi), replacing the second portion with a third portion of the cleaning fabric;

(viii) following step (vi), moving the assembly relative to the surface and/or moving the surface relative to the assembly; and (ix) following step (viii), repeating steps (i)-(viii) with respect to a second region of the surface and with the third portion and a fourth portion of the cleaning fabric, wherein the second region is different than the first region.

B1. The method of paragraph B, wherein the delivering includes delivering cleaning fluid to the first portion of the cleaning fabric.

B2. The method of any of paragraphs B-B1, wherein the delivering includes delivering cleaning fluid to the first region of the surface.

B3. The method of any of paragraphs B-132, wherein the cleaning fluid includes one or more of a liquid cleaner, a gaseous cleaner, and a solid cleaner, optionally a solvent, such as methyl propyl ketone.

B4. The method of any of paragraphs B-133, wherein the first predefined motion includes an orbital motion.

B5. The method of any of paragraphs B-134, wherein the second predefined motion includes an orbital motion.

B6. The method of any of paragraphs B-135, wherein the first predefined motion is the same as the second predefined motion.

B7. The method of any of paragraphs B-136, wherein the replacing the first portion and the replacing the second portion includes advancing a length of cleaning fabric across an applicator positioned to cause the engaging and the moving the first portion and the engaging and the moving the second portion.

B7.1. The method of paragraph B7, wherein the advancing includes advancing the length of cleaning fabric from a supply spool.

B7.1.1. The method of paragraph B7.1, wherein the advancing further includes advancing the length of cleaning fabric from the supply spool to a take-up spool.

B7.2. The method of any of paragraphs B7-B7.1.1, wherein the advancing further includes maintaining a tension on the cleaning fabric at the applicator.

B8. The method of any of paragraphs B-137.2, further comprising:

(x) scanning the surface and acquiring cleanliness data.

B8.1. The method of paragraph B8, further comprising:

(xi) responsive to step (x), and based on the cleanliness data, one or more of:
 (a) modifying a volume of cleaning fluid delivered during step (i);
 (b) modifying a length of time that the applicator is moved during step (ii);
 (c) modifying the motion of the first predefined motion;
 (d) modifying a length of time that the applicator is moved during step (v);
 (e) modifying the motion of the second predefined motion;
 (f) repeating at least a subset of (i)-(vii) one or more times prior to performing step (viii); and
 (g) sending a signal to an operator, wherein the signal is indicative of the cleanliness data.

B9. The method of any of paragraphs B-B8.1, wherein the cleaning fabric includes one or more of polyester, nylon, wood pulp, rayon, and cotton.

B10. The method of any of paragraphs B-B9, wherein the method is performed by the assembly of any of paragraphs A-A16.

B11. The method of any of paragraphs B-B10, wherein the surface includes a planar surface.

B12. The method of any of paragraphs B-B11, wherein the surface includes a non-planar surface.

B13. The method of any of paragraphs B-B12, wherein the surface is defined by a reinforced composite plastic material.

B14. The method of any of paragraphs B-B13, wherein the surface is defined by an aerospace component, optionally a winglet.

B15. The method of any of paragraphs B-B14, wherein the surface is defined by a component of an apparatus being manufactured in a manufacturing facility.

B16. The method of any of paragraphs B-B15, wherein the method is performed prior to painting, coating, or otherwise applying a material to the surface.

B17. The method of any of paragraphs B-B16, following step (ix), painting, coating, or otherwise applying a material to the surface.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of cleaning a surface with a robotic surface-cleaning assembly comprising a cleaning fabric, the method comprising:
 (i) delivering cleaning fluid to (a) a first portion of the cleaning fabric and/or (b) a first region of the surface;
 (ii) following step (i), engaging the first region with the first portion and moving the first portion in a first predefined motion across the first region;
 (iii) following step (ii), disengaging the first portion from the first region;
 (iv) following step (iii), replacing the first portion with a second portion of the cleaning fabric;
 (v) following step (iv), engaging the first region with the second portion and moving the second portion in a second predefined motion across the first region;
 (vi) following step (v), disengaging the second portion from the first region;

(vii) following step (vi), replacing the second portion with a third portion of the cleaning fabric;

(viii) following step (vi), moving the assembly relative to the surface and/or moving the surface relative to the assembly; and (ix) following step (viii), repeating steps (i)(viii) with respect to a second region of the surface and with the third portion and a fourth portion of the cleaning fabric, wherein the second region is different than the first region.

2. The method of claim 1, wherein the delivering includes delivering cleaning fluid to the first portion of the cleaning fabric.

3. The method of claim 1, wherein the delivering includes delivering cleaning fluid to the first region of the surface.

4. The method of claim 1, wherein the cleaning fluid includes one or more of a liquid cleaner, a gaseous cleaner, and a solid cleaner.

5. The method of claim 1, wherein the first predefined motion includes an orbital motion.

6. The method of claim 1, wherein the second predefined motion includes an orbital motion.

7. The method of claim 1, wherein the first predefined motion is the same as the second predefined motion.

8. The method of claim 1, wherein the replacing the first portion and the replacing the second portion includes advancing a length of cleaning fabric across an applicator positioned to cause the engaging and the moving the first portion and the engaging and the moving the second portion.

9. The method of claim 8, wherein the advancing includes advancing the length of cleaning fabric from a supply spool.

10. The method of claim 9, wherein the advancing further includes advancing the length of cleaning fabric from the supply spool to a take-up spool.

11. The method of claim 8, wherein the advancing further includes maintaining a tension on the cleaning fabric at the applicator.

12. The method of claim 1, further comprising:

(x) scanning the surface and acquiring cleanliness data.

13. The method of claim 12, further comprising:

(xi) responsive to step (x), and based on the cleanliness data, one or more of:
  (a) modifying a volume of cleaning fluid delivered during step (i);
  (b) modifying a length of time that the first portion is moved during step (ii);
  (c) modifying the motion of the first predefined motion;
  (d) modifying a length of time that the second portion is moved during step (v);
  (e) modifying the motion of the second predefined motion;
  (f) repeating at least a subset of (i)(vii) one or more times prior to performing step (viii); and
  (g) sending a signal to an operator, wherein the signal is indicative of the cleanliness data.

14. The method of claim 1, wherein the surface is a planar surface such that:
  step (i) comprises delivering cleaning fluid to (a) the first portion of the cleaning fabric and/or (b) the first region of the planar surface;
  step (viii) comprises following step (vi), moving the assembly relative to the planar surface and/or moving the planar surface relative to the assembly; and
  step (ix) comprises following step (viii), repeating steps (i)-(viii) with respect to the second region of the planar surface and with the third portion and the fourth portion of the cleaning fabric.

15. The method of claim 1, wherein the surface includes a non-planar surface such that:
  step (i) comprises delivering cleaning fluid to (a) the first portion of the cleaning fabric and/or (b) a first region of the non-planar surface;
  step (viii) comprises following step (vi), moving the assembly relative to the non-planar surface and/or moving the non-planar surface relative to the assembly; and
  step (ix) comprises following step (viii), repeating steps (i)-(viii) with respect to a second region of the non-planar surface and with the third portion and the fourth portion of the cleaning fabric.

16. The method of claim 1, wherein the surface is defined by a reinforced composite plastic material such that:
  step (i) comprises delivering cleaning fluid to (a) the first portion of the cleaning fabric and/or (b) a first region of the reinforced composite plastic material;
  step (viii) comprises following step (vi), moving the assembly relative to the reinforced composite plastic material and/or moving the reinforced composite plastic material relative to the assembly; and
  step (ix) comprises following step (viii), repeating steps (i)-(viii) with respect to a second region of the reinforced composite plastic material and with the third portion and the fourth portion of the cleaning fabric.

17. The method of claim 1, wherein the surface is defined by an aerospace component such that:
  step (i) comprises delivering cleaning fluid to (a) the first portion of the cleaning fabric and/or (b) a first region of the aerospace component;
  step (viii) comprises following step (vi), moving the assembly relative to the aerospace component and/or moving the aerospace component relative to the assembly; and
  step (ix) comprises following step (viii), repeating steps (i)-(viii) with respect to a second region of the aerospace component and with the third portion and the fourth portion of the cleaning fabric.

18. The method of claim 17, wherein the aerospace component is a winglet such that:
  step (i) comprises delivering cleaning fluid to (a) the first portion of the cleaning fabric and/or (b) the first region of the winglet;
  step (viii) comprises following step (vi), moving the assembly relative to the winglet and/or moving the winglet relative to the assembly; and
  step (ix) comprises following step (viii), repeating steps (i)-(viii) with respect to the second region of the winglet and with the third portion and the fourth portion of the cleaning fabric.

19. The method of claim 1, wherein the surface is defined by a component of an apparatus being manufactured in a manufacturing facility such that:
  step (i) comprises delivering cleaning fluid to (a) the first portion of the cleaning fabric and/or (b) a first region of the component;
  step (viii) comprises following step (vi), moving the assembly relative to the component and/or moving the component relative to the assembly; and
  step (ix) comprises following step (viii), repeating steps (i)-(viii) with respect to a second region of the component and with the third portion and the fourth portion of the cleaning fabric.

20. The method of claim 1, wherein the method is performed prior to painting, coating, or otherwise applying a material to the surface.

\* \* \* \* \*

UNITED STATES PATENT AND TRADEMARK OFFICE
CERTIFICATE OF CORRECTION

PATENT NO. : 11,192,149 B2
APPLICATION NO. : 16/036714
DATED : December 7, 2021
INVENTOR(S) : Jeffery P. Swanberg and Kevin Michael Bell Page 1 of 1

It is certified that error appears in the above-identified patent and that said Letters Patent is hereby corrected as shown below:

In the Claims

Claim 13, Column 15, Line 52, "a subset of (i)(vii)" should read --a subset of (i)-(vii)--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*